United States Patent [19]

Buron

[11] 4,034,159
[45] July 5, 1977

[54] SWITCHING SYSTEM FOR MULTICHANNEL LINES

[75] Inventor: Rene Henri Buron, St. Paul, France

[73] Assignee: International Business Machines Corporation, Armonk, N.Y.

[22] Filed: July 19, 1974

[21] Appl. No.: 490,142

[30] Foreign Application Priority Data

July 20, 1973 France .............................. 73.26959

[52] U.S. Cl. ..................... 179/15 AT; 179/18 EA
[51] Int. Cl.² ......................................... H04Q 11/00
[58] Field of Search ..... 179/15 AT, 18 GF, 15 AL, 179/18 EA; 340/172.5, 166 R; 325/4

[56] References Cited

UNITED STATES PATENTS

| | | | |
|---|---|---|---|
| 3,281,536 | 10/1966 | Dupieux et al. ................ | 179/15 AT |
| 3,462,743 | 8/1969 | Milewski ........................ | 340/172.5 |
| 3,609,668 | 9/1971 | Dupieux et al. ................ | 340/172.5 |
| 3,705,958 | 12/1972 | Jacob ............................. | 179/15 AT |
| 3,761,619 | 9/1973 | Pommerening ................ | 179/15 AT |
| 3,818,142 | 6/1974 | Edstrom et al. ............... | 179/15 AT |
| 3,819,865 | 6/1974 | Weber et al. .................. | 179/15 AT |

Primary Examiner—David L. Stewart
Attorney, Agent, or Firm—Frederick D. Poag

[57] ABSTRACT

A switching exchange of the space switching type is adapted to provide interconnection of the lines of a communication network, each line being able to provide several multiplex channels, each channel being different from the other ones in the frequency domain, in the time domain or in any other way. The control unit of a switching exchange of the space switching type is adapted to enable the system to interconnect more than two lines of the multiplex type together, by the provision of complementary logic which determines for any new connection of multiplex lines whether the required connection is possible or not in accordance with the state of the network when this request occurs. This operation is carried out by checking what are the lines which would be interconnected should the required connection be made, and whether the use of the transmission channels in the assembly of said lines, as it is in the initial state, will cause interference between the channels when the required connection is made. To carry this checking out, independent groups of interconnected lines are defined. The fact that said groups are independent and the changes which can be caused to said groups and to their independence by any new condition determine the connections to be checked before the new connection can be able to be made. Tables in memory, and logic, are provided to show present status and available possibilities of new interconnections.

2 Claims, 11 Drawing Figures

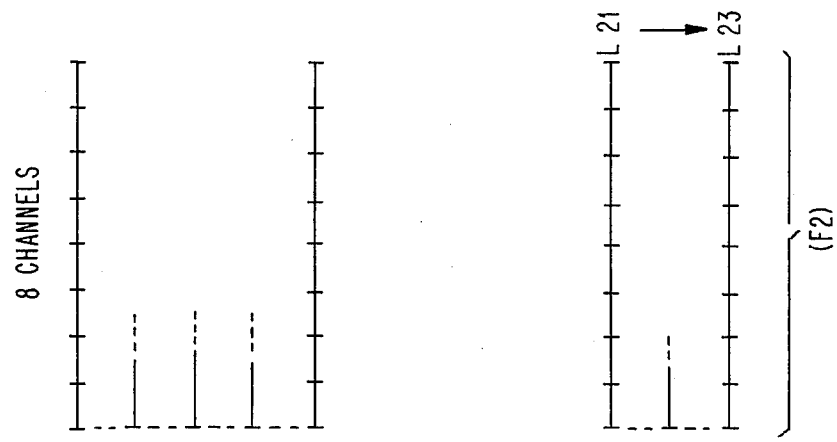
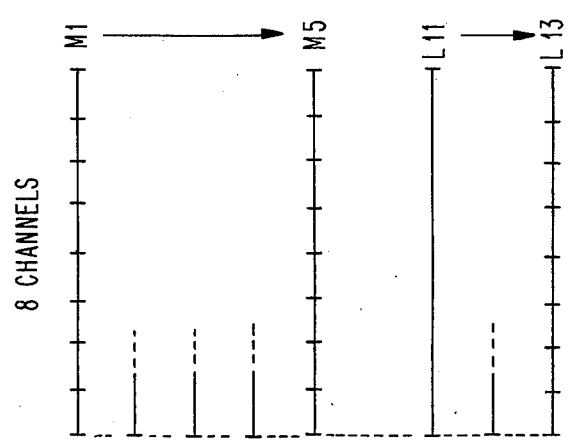
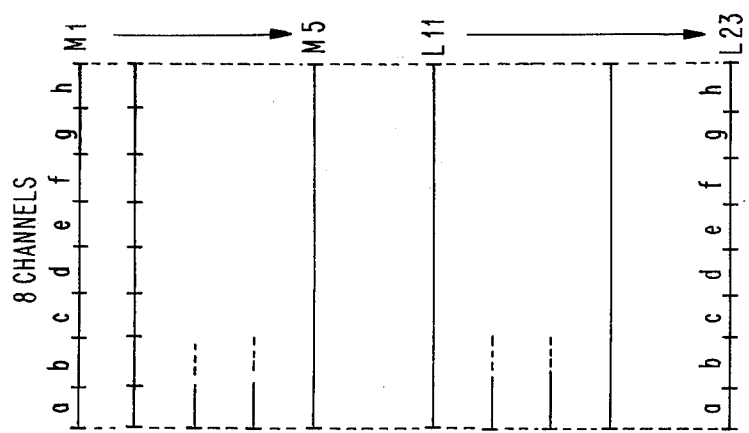

FIG. 5

TABLE 1

| TABLE | Ad | 1 | 2 | ~ | 8 | 9 | 10 | ~ | A | A | A | B | B | B |
|---|---|---|---|---|---|---|---|---|---|---|---|---|---|---|
| 1 | LINE | M1 | M1 | | M1 | M2 | 2 | | L11 | L12 | L13 | L21 | L22 | L23 |
| | COMPLEMENTARY INF. | | | | | | | | | | | | | |

TABLE 2

| | | a | | b | | c | | d | | e | | f | | g | | h | | PA3 | | | | |
|---|---|---|---|---|---|---|---|---|---|---|---|---|---|---|---|---|---|---|---|---|---|---|
| | | Ad | Mi | Ad | Mi | Ad | Mi | Ad | Mi | Ad | Mi | Ad | Mi | Ad | Mi | Ad | Mi | M1 | M2 | M3 | M4 | M5 |
| | Nm Nr | | | | | | | | | | | | | | | | | | | | | |
| L11 | 8 4 | 1 | M1 | 3 | M1 | 2 | M1 | 4 | M1 | 9 | M2 | | | | | | | X | | | | |
| L12 | 8 3 | 12 | M2 | | | | | | | | | | | 15 | M3 | | | | X | X | | |
| L13 | 8 0 | | | | | | | | | | | | | | | | | | | | | |
| L21 | 8 2 | 29 | M5 | | | 32 | M5 | | | | | | | | | | | | X | | | |
| L22 | 8 1 | | | | | 13 | M2 | | | | | 18 | M3 | | | | | | | X | | |
| L23 | 8 3 | | | 22 | M4 | | | | | | | | | | | 25 | M4 | | | X | X | X |
| | | PA1 | | | | | | | | PA2 | | | | | | | | PA3 | | | | |

A = {L11, L12, L13}
B = {L21, L22, L23}

TABLE 3

| | L11 | L12 | L13 | L21 | L22 | L23 | M1 | M2 | M3 | M4 | M5 | E1 | E2 a | b | c | d | e | f | g | h |
|---|---|---|---|---|---|---|---|---|---|---|---|---|---|---|---|---|---|---|---|---|
| 61 | X | | | | | | | | | | | | X | X | X | X | | | | |
| 62 | | X | X | | X | | | | | | | | X | X | X | | | | | |
| 63 | | | | | X | | | X | X | X | | X | | X | X | X | | X | X | X | X |
| 64 | | | | | | | | | | | | | | X | | | | | | |
| 65 | | | | | | | | | | | | | | | | | | | | |
| 60 | | | | | | | | | | | | | | | | | | | | |
| 601 | | | | X | | | X | | | | | | | X | X | | | | | |
| 602 | | | | X | X | | X | | | | | | | X | X | X | | | | |
| 603 | | | | X | | | X | | | | | | | X | X | X | | | | |

FIG. 6

SWITCHING SYSTEM FOR MULTICHANNEL LINES

BACKGROUND OF THE INVENTION

1. Field of the Invention

This invention relates to the adaptation of a switching system using an exchange of the space switching type, to interconnect the lines of a communication network, each line being able to ensure the transmission of several communications in multiplex mode on respective channels which are different one from the others, the difference being possible either in the frequency domain, in the time domain or in any other way.

More particularly, this invention relates to such an adaptation when the nature of the communication does not involve a total independence of said communications, but, on the contrary, allows a common supervision of certain characteristics of the network, in particular a common definition of the channels in use. A particularly interesting example of such a case is given by the relations between peripheral units, also called "terminals", and one or several central units.

2. Description of the Prior Art

The problem relating to the interconnection of multiplex lines concerns the networks connecting terminals and central units as well as the telephone systems including multiplex lines for long distance calls.

In the present state of the technique concerning the central unit, terminal links, one has, on the one hand, the link of a central unit to several terminals with a common line and transmission in multiplex mode of messages on this line, and on the other hand, the link of one or several central units to terminals through a switching system, in which case, a single line ensures only one communication. The combination of the switching system and of multiplex lines does not appear.

A technique for switching multiplex lines through a space switching exchange is described in U.S. Pat. No. 3,652,803 which relates more particularly to the switching of multiplex telephone lines. In this case, the communications are independent and a common determination of the channels is very difficult. In that patent, the solution consists mainly in providing a channel register corresponding to each transmission channel of each line, and in interconnecting any one of the channel registers to another channel register through the exchange. This enables the link relating to a communication using channel $x$ of a line and channel $y$ of another line. Such a solution would be applicable should a common channel definition be possible, but it would not take any advantage of this additional condition.

The major difference between the present invention and the above identified patent lies in the fact that this invention does not use any channel register and that only the exchange control unit is adapted by the addition of an additional logic without modifying the exchange control logic itself. Among the advantages of this invention, the elimination of the registers corresponds to a real increase of the exchange capacity since only one input of the exchange corresponds to one multiplex line. Another advantage lies in the fact that any line can be connected to the exchange in the same way whether it is a multiplex line or an individual line, an individual line being a line providing only one communication as for example, a line connecting a subscriber's telephone set to an exchange. The exchange operation itself is also the same in both cases; accordingly, the exchange can be used simultaneously to inter-switch individual lines and multiplex lines, respectively.

SUMMARY OF THE INVENTION

A primary object of this invention is to provide an improvement of the control unit of a switching exchange of the space switching type and able to interconnect more than two lines together. The improvement enables such a system to interconnect more than two multiplex lines together as well as more than two individual lines.

For that purpose, this invention is more particularly characterized in that the additional logic determines, for any new connection of multiplex lines, whether the required connection is possible or not, according to the state of the network when this connection is requested, said state being called "initial state". This is done by determining what are the lines which would be interconnected should the required connection be carried out, and be determining whether the use of the transmission channels on all said lines, as it is in the initial state, would cause an inter-channel interference or not, should the required connection be carried out.

These and other objects, advantages and features of the present invention will become more readily apparent from the following specification when taken in conjunction with the drawings.

BRIEF DESCRIPTION OF THE DRAWINGS

FIGS. 4A and 4B show two examples of multiplex channels in the network of FIGS. 1 or 3.

FIG. 5 shows two network state characteristic tables employed in implementing the invention.

FIG. 6 shows a third network state characteristic table employed in implementing the invention.

DETAILED DESCRIPTION

Since this invention applies to domains in which it is possible to control the channels in use on the various interconnectable lines, the invention is of particular interest when a switching exchange of the space switching type is provided to interconnect lines which issue from one or several computers on the one hand, and, on the other hand, lines each one of which is connected to several terminals. Therefore the invention will be described within the scope of such an assembly but this does not restrict the scope of this invention. For example, the terminals can as well be punched card readers, or the telemetering or remote control devices, while the computers can as well be a computer central unit, as a multiplexer, or transmission control unit, etc. In the following, the terms "computer" and "terminals" will be used without restricting the scope of the invention. Similarly the fact that the invention is particularly adapted to improve switching exchanges of the "space switching type", will be understood in the following.

Figure 1:
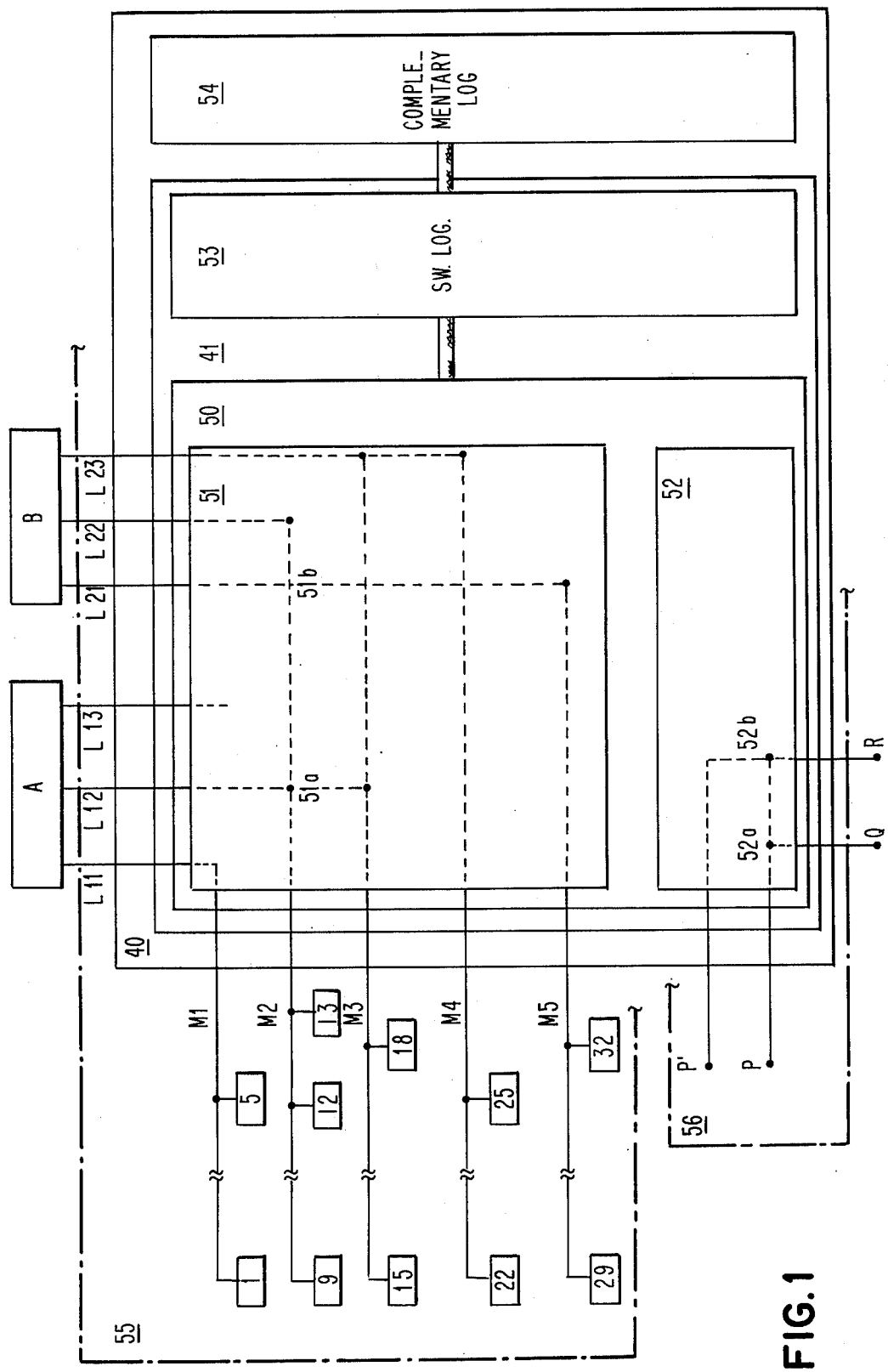
FIG. 1 is a schematic view of a communication network in which the adaptation of the invention is applied to the switching exchange.

FIG. 1 is a general view of a communication network in which there are various types of transmission lines connected to various devices and a switching assembly 40 enabling the inter-line interconnections. More specifically, switching assembly 40 is comprised of switching exchange 41 itself, which is not modified, and of additional logic 54 enabling the implementation of the adaptation according to this invention. Exchange 41 is comprised conventionally of switching circuits 50 and of their control unit which is switching logic 53. Each of the various lines of the network is connected to an input of switching circuits 50 in an order which, within the scope of the invention, does not depend on the line type. In the figure, the lines of the individual type as lines P,Q,R,P' are regrouped in 56 and the lines of the multiplex type are regrouped in 55, to make the understanding of the description easier. For the same reason, on the one hand, each line M connected to several terminals and, on the other hand, lines L linking the computers to the switching exchange, are regrouped in lines 55 in the figure. The number of lines M and the number of lines L, the number of terminals, the number of computers, (in this case: two, A and B), are completely arbitrary and only enable simpler references in the description.

The division of the lines into blocks 55 and 56 has led, in a way as arbitrary as above, to symbolize separately in 51 and 52, the sections of the switching matrix respectively concerning the section providing switching of multiplex lines M and L and the section connected to the individual lines. These two sections have an identical embodiment and in the system; they are not differentiated since the switching circuits are not modified. Switching exchange 41 does not form a part of the invention by itself and its operation is not modified by said invention, therefore it is not necessary to describe said exchange in detail. In the figure, it is assumed that switching exchange 41 uses only one stage also called "switching matrix". This is not intended to be restrictive at all, since the invention does not modify the nature of the system in use and in particular, does not modify the switching circuits. As far as switching logic 53 controlling exchange 41 is concerned, it carries out the supervision operations known as being necessary to an exchange, as recognizing a busy line, receiving and recording call numbers, sending a call, selecting the interconnection path between two lines, etc..

As referred to above, the problems of switching multiplex lines delt with by this invention appear principally in the case of an interconnection of more than two lines together. Now, this case will be studied and therefore, it is assumed for purposed of explanation that exchange 41 is of a type enabling the interconnection of more than two lines together. The possibility of interconnecting more than two lines together is known in telephony; then it is said that the exchange can provide conference connections between several lines. The conference circuits used for this purpose are of various types, depending on the nature of the exchange and of the equipment in use in said exchange. Therefore, they are integral with said exchange and will not be described further since they are not modified by this invention.

Figures 2, 3:
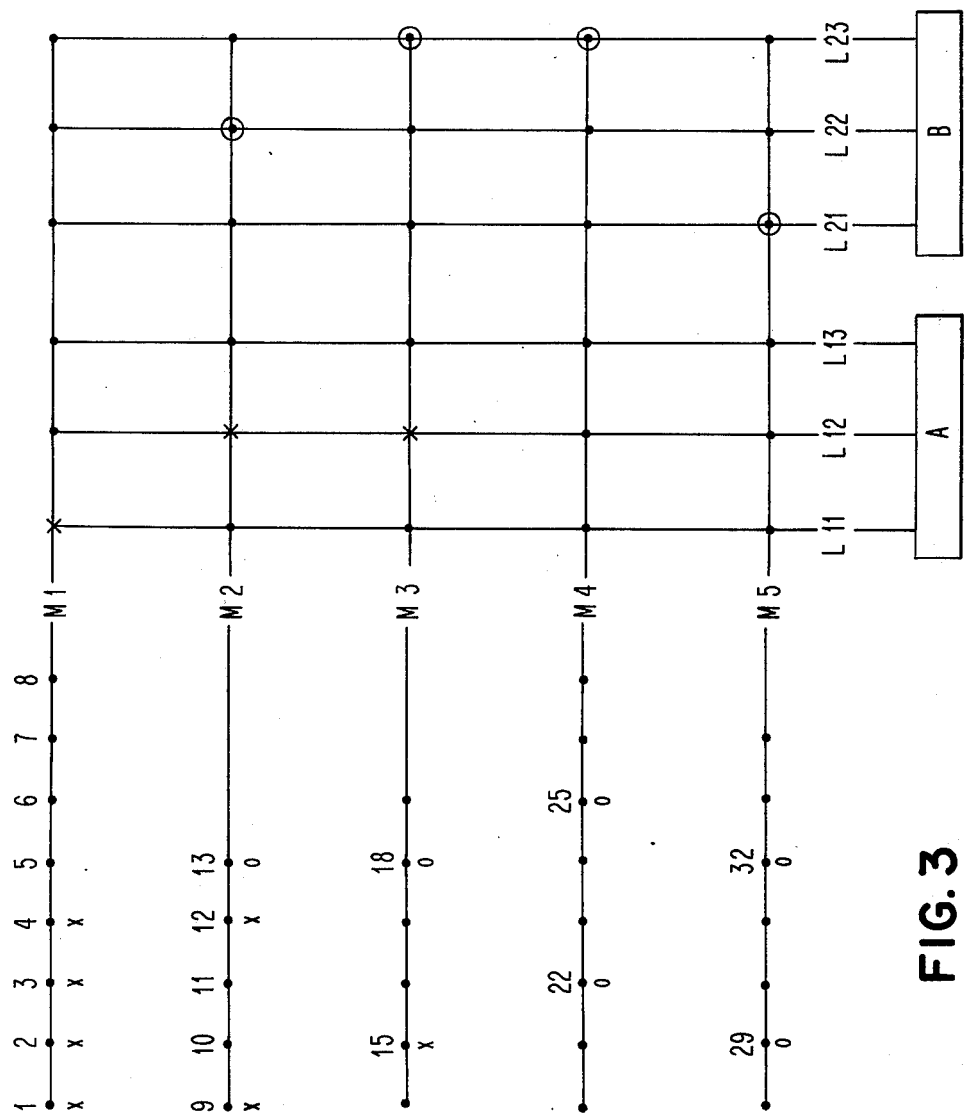
FIG. 2 shows shows an example of a connection point.
FIG. 3 shows a possible state of the connections in the network, at a given time arbitrarily chosen.

In any case, in such an exchange, the nature of the connection circuits enables the connection of several lines. For example as known circuits, reed relays can be employed in connection circuits having these possibilities. FIG. 2 shows an example of a connection circuit switch element of this type. If a circuit of this type located at connection point 52a is considered, lines P and Q are connected when the contacts of cross point relay 57 close, electromagnetic control 58 of which being controlled by logic 53. Similarly when lines M2, L12 and L21 of FIG. 1 are to be interconnected, logic 53 closes switches at cross points 51a and 51b. For connecting lines P, Q and R, cross point switches are closed at 52a and 52b. Of course, any equivalent mechanical or electronical connecting device can replace the various connection point circuits.

Logic 53 closes the switches according to the state (busy, free, etc) of the lines to be connected. However, as far as lines M and L are concerned, the state of these lines also depends on the conditions of transmission on these various lines and logic 53 enables such interconnection when a state information, indicating to said logic 53 whether the connection can be made or not, is supplied by additional logic 54. In practice, the state information supplied by additional logic 54, is used in any operation of logic 53 involving the use of the state of lines in group 55. The signal transfering such state information can be advantageously of the type of the signal indicating (in known telephone line switch equipments) to logic 53, that a line is disengaged or busy.

Having defined the nature of the invention and given its domain of applications, implementation of the invention in detail and its operation in establishing a new connection between multiplex lines will be described. Establishment of such a connection depends on the initial state of the network lines and of the transmission conditions on these lines.

It will be seen that a new connection will result in the interconnection of one or several lines with another line or a group of other already interconnected lines; this would create a new group of interconnected lines. Several groups of interconnected lines can be provided in the whole communication network, each group having no common point. Such groups being independent, the use of the transmission channels in anyone of these groups has no action on the use of said transmission channels in the other groups. A new connection to be made can create a common point between two of these groups; then, this interconnection cancels their independence and it is in the new group which would result from this connection that each channel will have to correspond to a single information transfer, in other words, to a single message. It will be seen that is some cases, the connection to be ensured, should it be impossible in the initial state of the network, can be made possible by a new distribution of the channels, provided that this new distribution of the channels can be made in a manner which is consistant with the communications in progress on the network. The transmission channels can be defined either in the time domain, in the frequency domain, or in both domains. Two channels are different in the frequency domain, when for example, the frequencies in use have different values; they are also different in this domain when a carrier having the same frequency is used with a phase shift of 90°, for example. In the same way, channels differ in time when the respective time intervals differ; such intervals may for example correspond to a message section, a character or a bit. The channels being defined, it is sufficient to have a same definition on all the multiplex lines of the network.

The various above-indicated conditions and the way to use said conditions, will be considered in detail by applying the whole process to the network of FIG. 1. This application to the FIG. 1 organization is made for purposes of illustration and is not be considered as restricting the scope of this invention. FIG. 3 is a schematic view of matrix 51 which can provide connection between lines L11, L12, L13 connected to computer A, lines L21 to L23 being connected to computer B and lines M1 to M5 being connected to the terminals. In this example, it is assumed that eight different channels $a,b,c,d,e,f,g,h$ (refer to figure 4A) are provided on the multiplex lines. For example, it can be considered that these channels are related to eight respective frequencies or to eight respective time intervals. Should the second case be employed, all the transmissions are carried out within the same frequency domain on the network of FIG. 3 and in time-differentiated channels.

In a same arbitrary manner, it would have been possible to consider that computer A communicates with the terminals on a frequency band (F1) and, within this band, communicates with them in given time intervals and that computer B proceeds in the same way in the same time intervals, but on a different frequency band (F2). In this third case, the eight channels considered as time channels in the second case, would be divided into two frequency domains, which would give 2 × 8 channels for the whole network (refer to FIG. 4B). In the following description, this third embodiment will not be considered in detail, but this shows that the definition of the channels is well possible under any condition and in any way.

To analyse the problems involved by a new connection, it will be considered that, at a given time, it becomes necessary to provide a new link, for example a link between terminal 5 and computer B. At this time, the network is in a given state; does this state permits to establish the required link?

This given state, called "initial state" since it defines the initial conditions for a new required connection, will be arbitrarily defined as follows, to provide a base for the described example:

Terminals 1, 2, 3, 4 are in relation with computer A through line L11, on channel $a$ for terminal 1, on channel $b$ for terminal 3, on channel $c$ for terminal 2, on channel $d$ for terminal 4, this involving the connection of lines M1 and L11.

Terminals 9 and 12 are in relation with computer A though ine L12 on channel $e$ for terminal 9, on channel $a$ for terminal 12, this involving the connection of lines M2 and L12.

Terminal 15 is in relation with computer A through line L12 on channel $g$; this involving the connection of lines M3 and L12.

Terminal 18 is in relation with computer B through line L23 on channel $f$; this involving the connection on lines M3 and L23.

Terminals 22 and 25 are in relation with computer B through line L23 on channels $b$ and $h$; this involving the connection of lines M4 and L23.

Terminals 29 and 32 are in relation with computer B through line L21 on channel $a$ for terminal 29 and on channel $c$ for terminal 32; this involving the connection of lines M5 and L21.

Terminal 13 is in relation with computer B through line L22 on channel $c$; this involving the connection of lines M2 and L22.

The initial state is summed up on Table 2 of FIG. 5 and the new connections are specially marked on FIG. 3. In FIG. 3, the points indicate the various possibles connections, the $x$'s indicate the connections made for the links in the initial state between computer A and terminals 1, 2, 3, 4, 9, 12, 15 and the O's indicate the connection made in the initial state for the links between computer B and terminals 13, 18, 22, 25, 29, 32.

Table 1 of FIG. 5 gives for each connected unit, terminal or computer, the correspondence between its address and the line connected to it. Table 1 can also include, if necessary, additional particular and typical indications about said units. In the following, it will be seen that this table and some other ones indicated later, will be included as memory positions in the circuits forming the additional logic to which they will provide the network state information. Table 2 of FIG. 5 includes in this case, a number of arrays equal to the number of lines connected to the computers, six in this case, and a certain number of columns. Table 2 includes a first part PA1 provided with two columns, column N$m$ indicating the maximum possible number of links on each line L connected to the computers and column N$r$ indicating the number of links made on each of these lines, and then, a second part PA2 including a number of pairs of columns equal to the number of the various transmissions channels, (in this example, channels $a$ to $h$); in each pair, a column A$d$ indicates the address of the terminal in which an information exchange is in progress (or the "talking" terminal or the terminal "in comunication") and the second column M$i$ indicates the line connected to the terminal.

Thus, it is seen in this table that, for example, at the intersection of the array corresponding to line L11 with the pair of columns corresponding to channel $a$, indications 1 and M1 are respectively read, which means that terminal 1 located on line M1 is in relation with computer A through line L11, and this, on channel $a$. The table shows third part PA3 which includes a number of columns equal to the number of lines M (in this case, five columns) and a cross in an array/column intersection square, indicates that line M corresponding to this column is connected to line L corresponding to the array. If two crosses appear in a same column, for example in column M3 for array L12 and array L23, this corresponds to the fact that line L12 and the other lines which are connected to said line L12, are connected through line M3, to line L23 and to all other lines M connected to said line L23. Of course, with a different number of lines L, a different number of lines in the table is obtained, a different number of channels corresponds to a same different number of pairs of columns in part PA2, and another number of columns in part PA3 corresponds to another same number of lines M. Therefore, Table 2 gives the connections made between lines L and M, the channels in use on the various connections and the terminals connected through the various connections. Table 2 is updated on each modification of this state. This function of table 2 does not depend on the way it is effectively carried out; the information contained in it can be separately memorized and re-assembled whenever necessary. The presentation of FIG. 5 has been chosed to make the understanding of this invention easier.

After having defined the initial state of the network and shown it on FIGS. 3 and 5, first of all, the network will be checked to be sure that in this chosen initial state, it meets the requirement of non-interference in the use of the channels as they are defined on this network; i.e. the state arbitrarily chosen as an example will be checked as a possible state. In the actual operation of the network, such a check is never carried out in fact since any modificaton of the state of the network by a new connection is made only when the resulting state is a new possible state, this new state being the initial state for any next new required connection. This being the mode of operation from the very first connection of two lines, each successive state satisfies the requirement.

But, within the scope of the explanation of the operation of this ivention, this check will enable to show, through this example (but without restricting the invention), important features of the network state at a given time. In FIG. 3, it is seen that lines M1 and L11 are interconnected but not with any other one, therefore, any event on the group formed by said lines, is independent from, and without action on what happens in the remaining part of the network. This independence appears as well in part PA3 of Table 2 of FIG. 5; in effect, indication M1 appears only on the first array position corresponding to line L11 and neither indication M2, indication M3, indication M4 nor indication M5 appear in this same array, which indicates the fact that lines L11 and M1 are connected only together and not to any other one. Thus, these two lines form a first independent group. In the same way, it is seen in FIG. 3 that lines M5 and L21 are connected together and not to any other one; this property appears again in part PA3 of table 2 since indication M5 appears only on array L21 and since neither M1, M2, M3 nor M4 appear on array L21. L21 and M5 form a second independent group. Also, it is seen in FIG. 3 that (1) lines M3 and M2 are both connected with line L12, (2) lines M3 and M4 are both interconnected with line L23, (3) that all these lines are in fact interconnected together through common line M3, (4) they are connected to line L22 since said line is connected to one of said lines, (i.e. to M2), (5) they are not connected to any other line. These properties appear again on part PA3 of table 2; point (1) is indicated by the presence of M3 and M2 on same array L12, point (2) is indicated by the presence of M3 and M4 on same array L23, point (3) is indicated by the presence of M3 in both arrays L12 and L23, point (4) is indicated by the fact that M2 appears on arrays L12 and L22, while point (5) is indicated by the absence of other indications on the set of arrays L12, L22, L23. All these other lines form a third independent group. Now, it should be noted that the interconnection of lines together does not involve any problem for the channels used all these lines since said channels are different (in this case, $a,b,c,e,f,g$). Similarly, it is seen that the use of a same channel, (for example for a link using lines L12 and M2 and for a link using lines L22 and M2), is to be rejected since it would result in message mixing; it would cause, in part PA2 of Table 2, an indication M2 in array L12 and an indication M2 in array L22 to appear in a same column assigned to said channel.

The network in the initial state chosen for the example, includes three groups of independent lines, without any common point between the groups, which precludes any interference between the use of channels $a$, $b$, $c$, $d$ in the first group, the use of channels $a$ and $c$ in the second group and the use of channels $a, b, c, d, e, f, g$ in the third group.

The notion of independant groups and the modifications which any new connection can applied to these groups and to their independence are, therefore, more particularly important to determine whether the required connection can be made or not. It's the reason why the characteristics of the independent groups existing in a given initial state and the characteristics defining the new connection to be made, are reported in a Table 3. This table, shown in FIG. 6, is formed by a number of arrays equal to the number of possible independent line-groups in the considered network plus an array for the new connection. The contents of the array of the new connection are defined by the characteristics of the new connection to be made. The contents of each array of independent groups are formed by the characteristics defining each of these groups and obtained by reading parts PA3 and PA2 of Table 2. Therefore the connection possibility conditions will be defined by comparisons performed on the contents on these groups. To determine the maximum number of possible independent groups, it should be noted that the smaller are the groups, the higher is the number of groups. The smallest group being comprised of two interconnected lines, the maximum number of groups is given by the integer part of the quotient of the division of the number of multiplex lines by 2. In the case where certain lines connect the exchange to the terminals, (in this case, lines M) and other lines connect the exchange to a computer and when there is at least, the connection of a line L with a line M, the above-defined maximum number of groups is also given by the smallest of the numbers of lines M and lines L. The configuration of this table allows, for its memory embodiment, to make a register correspond to each array; then, the term "register" will be used in the following. For said array, each register includes a series of positions E1 (11 positions in the network of this example), each one corresponding to one of the lines of the network, and a series of positions E2, each one corresponding to a channel (eight positions in the network of the example). In each group, the positions corresponding to the interconnected lines, contain an indication appearing as a cross on the table of FIG. 6. It is the same for the positions corresponding to the channels used in the group. Table 3 of FIG. 6 corresponds to the network of FIG. 1 and to the connections of FIG. 3; therefore, there are five group registers, (in this case, registers 61 to 65) and a new connection register 60. For the network of this example, it is seen that, in register 61, the characteristics defining the first independent group of lines L11, M1 appear again; in register 62, the characteristics defining the second independent group of lines L21, M5 appear again. In register 63, the characteristics defining the third independent group of lines L12, L22, L23, M2, M3, M4 appear again. There are five registers since a maximum of five independent groups of lines can be provided in this network. In the case of the connections in use, they are only three independent groups; it is for this reason that there are only three registers containing information. It is seen that, the groups being independent, there is only one indication per column as a maximum, for the E1 section of the various registers. As far as arrays 601, 602, 603 shown in FIG. 6 and separated from Table 3 are concerned, they do not correspond to any new register but give, in fact, the contents of register 60 for three respective examples of required new connections which will be considered later.

Now, it is possible to understand what happens when a new connection is to be made between two lines to enable a communication between the two devices respectively connected to these lines. To determine whether a connection is possible or not, the indication of the two corresponding lines in part E1 of register 60 is introduced and the contents of this register is compared to the contents of part E1 of registers 61 to 63. In fact, the comparison can be extended to the contents of all the group registers, in this example, 61 to 65, the registers not in use involving no change in the result.

Now, it should be noted that in any case, there are only two positions E1 of register 60 which bear an indication since the new connection relates to only two lines and it can be possible to find only a maximum of two cases of correspondence when the contents of register 60, part E1 will be successively compared with the contents (part E1) of the group registers; in the non-limiting case of the network taken as an example, it was seen that there are five group registers. Should no correspondence be found, the new connection is fully independent and thus, both lines will be connected and will form a new group; the link does not involve any problem since both lines are not in use and any channel is free on these lines and could be taken for the communication to be carried out. Should only one case of correspondence be found with the contents of only one register, this means that the corresponding independent group of lines is the only one concerned by said new connection; should it be made, the group will include in addition, the line which has not given any coincidence. The effective link could be used if at least one transmission channel remains available for a new communication in this group, which can be checked from part E2 of the register of this group.

In effect, the new link will require the use of a channel not yet put in use, therefore said channel should be available in the initial state of the network. This channel is called "additional channel" since it should be considered as added to the number of the channels in use in the initial state of the network. This notion of "additional channel" is indicated in this specification for the first time but it is the same for any new connection.

If two correspondence cases are found, both being found together when comparing the contents of a register with the contents of register 60, this means that the connection to be made is already made in the corresponding group which also in this case, is the only one concerned by said connection; also, the effective link will be able to be used if, in this group, it remains at least one available transmission channel, which will be checked as in the previous case.

If two correspondence cases are found, one in a register, the second one in another register, this means that two independent groups of lines in the initial state will be concerned by the same connection and therefore, made interdependent and then, it is necessary to check that there is no potential interference between the channels in use on these two groups, said interference being able to become effective should the new connection be made. This will be checked by using part E2 of the registers. As far as the first two cases are concerned, the use of the registers is very simple, in the third case, in which the connection to be made makes two independent groups in the initial state, to become interdependent, the use of the registers is more complex, the comparisons being to be carried out on the contents of part E2 of the register. Therefore, it is in this third case which is more complicated that the use of the registers of table 3 will be described again in detail, through a more particular example.

For example, it is assumed that it becomes necessary to establish a link between terminal 5 and computer B; this example is not restrictive. To establish said link, it will be seen that there are three possible new connections, each one will be studied, which will show various possible problems and their solution and therefore, will allow a better explanation of the general search process for determining whether a new connection is possible or not.

The establishment of a link between terminal 5 and computer B requires the connection of line M1 connected to this terminal, to one of the three lines L21, L22 and L23 connected to computer B.

As M1 is connected, in the initial state, to L11, should M1 be connected to L21, a new group M1, L11, L21, M5 would be formed; but the channels used on L11 and L21 are no longer independent and then, channels $a$ and $c$ used in the initial state on L11 and L21 for various respective links, become interfering. The first connection to be made is not possible in the initial state of the network.

If the second case is considered, the case of the connection of M1 with L23, and the third case, the case of the connection of M1 with L2, either one of said lines L22 and L23 belonging to the same third group of interconnected lines, then a new group is formed. But in this case, the uses in initial state of channels $a$, $b$, $c$, on L11 on the one hand and on L23 and L22 on the other hand for different respective links, become interfering. The second and third new connections to be made are not possible in the intital state of the network.

The above explanation appears in table 3 by comparing the contents of registers 61, 62 and 63 and the contents of register 60. In the case of the network of this example, a contents of register 60 corresponds to each one of the three possible connections, these three states of the contents of register 60 are respectively given in arrays 601, 602, 603 of FIG. 6. Since they represent three hypothetical states of the contents of register 60, the representation of these arrays include, like register 60, the division of into two parts E1 and E2. Thus, in part E1 of 601, one finds in positions L21 and M1, the two marks indicating that these two lines are the ones to be connected in the first solution; in 602, one has two indications in L23 and M1 which correspond to the connection of the second solution,; in 603, one has two indications on L22 and M1 which correspond to the connection of the third solution. Assuming that the first solution is carried out, i.e. the link of L21 and M1, then register 60 would have the contents given in 601 by part E1. One compares the contents of part E1 of register 60 to the contents of part E1 in registers 61, 62, etc. a correspondence case is found in columns M1 for register 61 and another one in column L21 for register 62, which indicates that the first and second groups become interdependent if the new connection to be carried out is really made.

Now, one will determine whether there are common channels in use or not, on the groups made interdependent. This is given by part E2 of registers 61 and 62 which show an interference on channel $a$ and on channel c. The existance of these interferences is reported in the corresponding position of register 60 the contents of which is shown in array 601 in this case. But part E2 shows the fact that in the two groups remain a number of disengaged channels at least equal to K+1 (in this example, it exceeds this value), K being equal to the number of interfering channels. One considers here K+1 and not K to take into account the additional channel which would be used by terminal 5, should the connection be made.

It should be noted that the junction would not cause interference anymore if, in group 2, channels $f$ and $g$ are used, for example, instead of channels $a$ and $c$ and if channel $e$ for example, is assigned to terminal 5. Such a channel transfer will be possible if the units which are in relation on these channels, can, due to their nature, make this transfer possible. As far as the identificaton of these units is concerned, they appear n talbe 2, part Pa2 and part Pa1, which shows that in question in this example, are computer B and terminals 29 and 32. The indication enabling determination of whether it is possible or not to communicate with a unit on a given channel type or on several types, is included in the characteristics of the unit, which can be given as additional information in table 1.

It is possible to proceed in the same way for the second possible connection L23, M1, and for the third possible connection L22, M1.

In the case of the third connection, the two lines in use are marked in L22 and M1 in array 603, part E1; therefore, these are the indications which are contained, in this case, in part E1 of register 60. A comparison between the contents of this register and the contents of registers 61 to 62 shows then, that the connection to be made makes groups 1 and 3 to which registers 61 and 63 correspond, interdependent. Then, part E2 of table 3 shows that for these two registers, there is an interference in groups 1 and 3 between channels $a$, $b$ and $c$. Therefore, the connection is impossible. It is not possible to try to make this connection possible as in the first connection case, by a channel transfer, since the registers shown that channels $e$, $f$, $g$ and $h$ are not available on the two groups of lines in the same time. It can be noted that connection L22, M1 would be made possible by cancelling junction L22 in the third group of lines, since then, a junction L22, M1 would not create anymore interdependences between the first group of lines and the third group which was thus modified. Table 2, part Pa2 shows that the cancellation of the junction existing between line L22 and another line, in this case line M2, of the third group, cancels the link between terminal 13 and computer B; in a terminal/computer relation, such a possibility of cancellation is not, a priori, impossible. This type of problem is solved in accordance with the priorities which govern this type of relation which are the priorities of a computer over another one with respect to their relations with a group of terminals, or the priorities of a terminal over other ones. This information will be, as in the computer system existing to day, assembled in a priority table which will be often added to tables 1, 2 and 3.

When a connection to be made creates an interdependence between two groups and when the check of these two groups does not show any interference of the channels in the initial state, it is recalled that on this connection, the new link will be established on the previously defined additional channel, and it is necessary to be sure that this channel will not create any interference. To do this, it is necessary to be sure that there remains a same channel available on the two independent groups of the initial state.

This description has successively determined the type of switching exchanges to which this invention can be applied, then it has defined the network state information required to implement the invention and the way to use that information.

Figure 7:
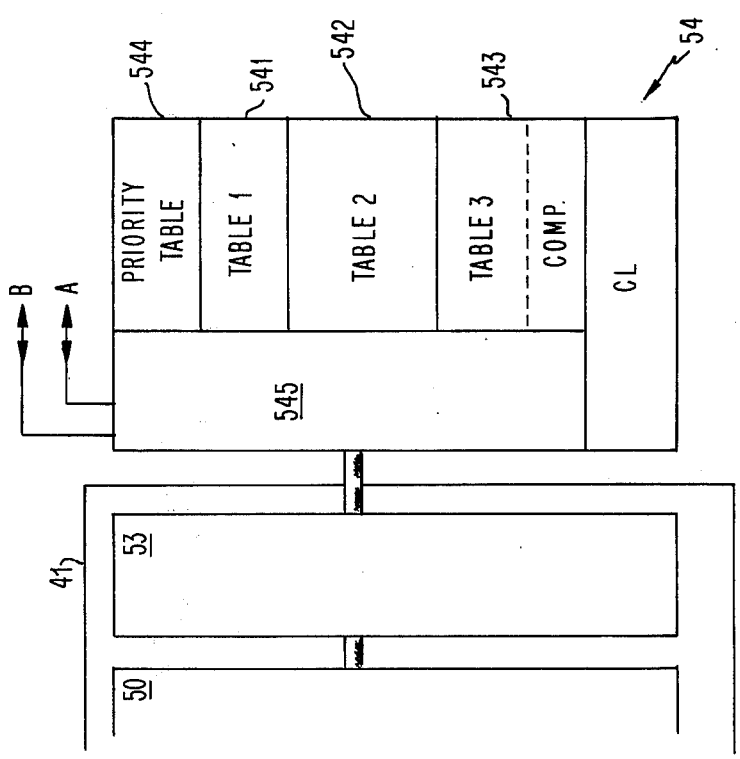
FIG. 7 is a schematic view of circuit blocks enabling the implementation of the invention.

Now, the description will turn to definition of the elements forming the logic assembly using this invention, said logic assembly being logic 54 completing normal logic 53 which controls switching exchange 41 of FIG. 1. Logic 54 is shown schematically in FIG. 7.

In this diagram, one finds in 541, 542, 543 and 544, various Tables 1, 2 and 3 and the Priority Table, the use and the contents of which being previously indicated. In 543, Table 3 is associated to the comparing circuits (COMP) allowing its use. One finds in 545, complementary logic circuits and in CL, channel supervision circuits. According to the arrangement of the network, the function of channel supervision circuits CL can be very variable; thus, they will really supervise the channel definition homogeneity, or they will have an information function in this domain. For example, if the channels in use are time-channels, it is possible to have a network in which circuits CL are clock circuits supervising all the clock circuits of the network control units, as the clock circuits, (at least as far as the transmission is concerned), of computers A and B in the case of the network of FIG. 1. In a network in which the channels would be defined in the frequency domain, it can be contemplated that their function would be limited to inform the new connected units about the frequency channel assigned to said unit. Therefore, the nature of circuits CL is not defined in relation with the invention itself but by the transmission modes adopted on the network.

As far as tables 1 and 2 in 541 and 542 respectively, are concerned, their composition is indicated in FIG. 5. The priority table in 544 is used only under certain circumstances, which were previously indicated.

The nature of priority systems in general and thus of this table is well known in data processing systems. The three tables in 541, 542 and 544 are formed by memory positions of any known type; the usual circuits enabling reading and writing are associated to said memory positions. Such circuits are included in the circuit block in 545 in FIG. 7.

A preferred embodiment, in accordance with this invention, of assembly 543 including Table 3 and the comparing circuits, is shown on FIG. 10. This embodiment will be considered in detail later. As far as circuits of block 545 are concerned, they also include interface circuits to receive the requests for new connections on the multiplex lines, said requests being received by exchange 41, and to inform logic 53 conventionally controlling the exchange whether a requested connection can be effectively made or not. These interface circuits also provide the relations between channel supervision circuits CL and the unit(s) controlling the communication on the network.

Figure 8:
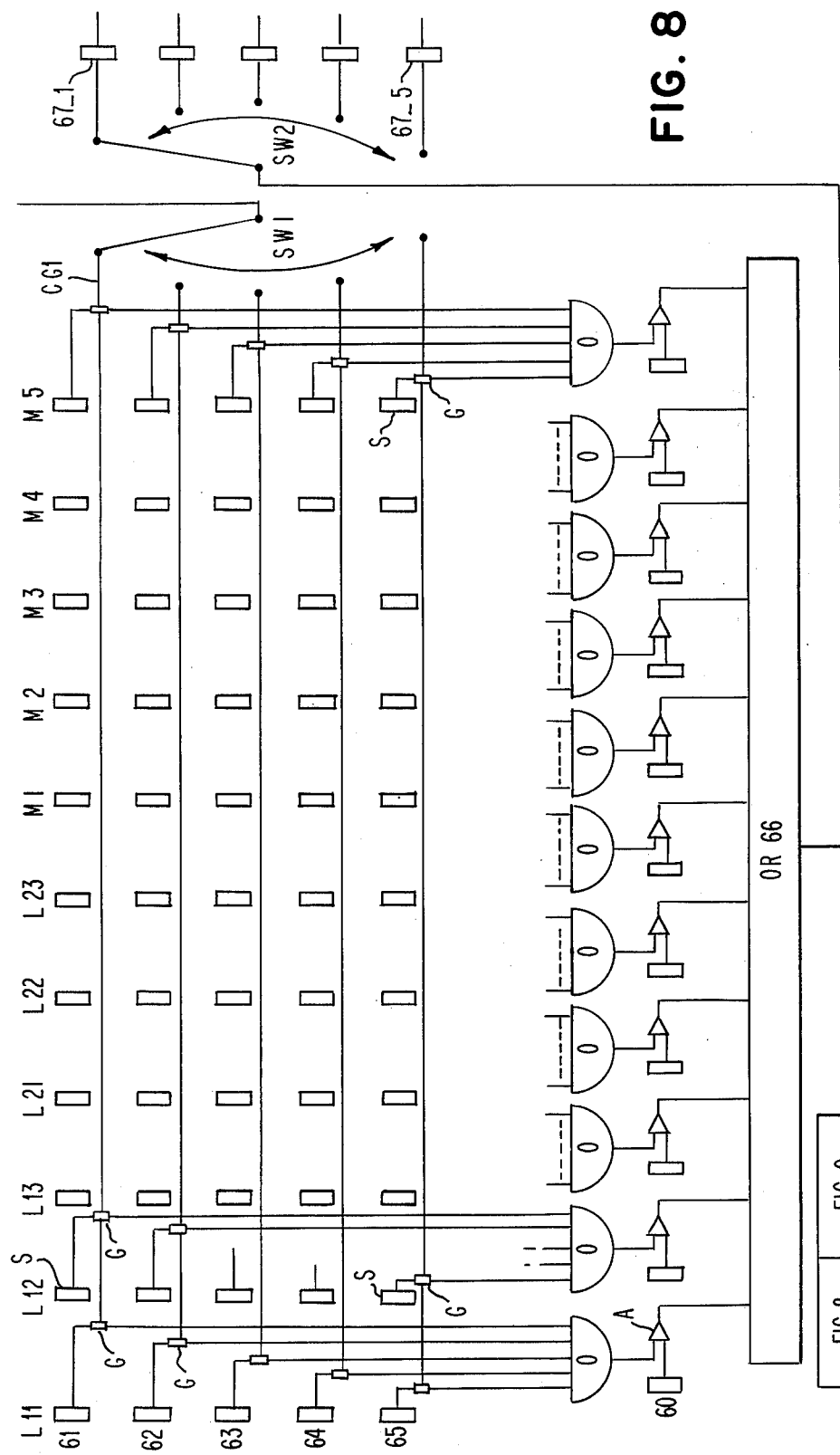
FIGS. 8 and 9, when assembled as shown on FIG. 10, show a preferred embodiment of the circuits providing the third table.
Figure 9:
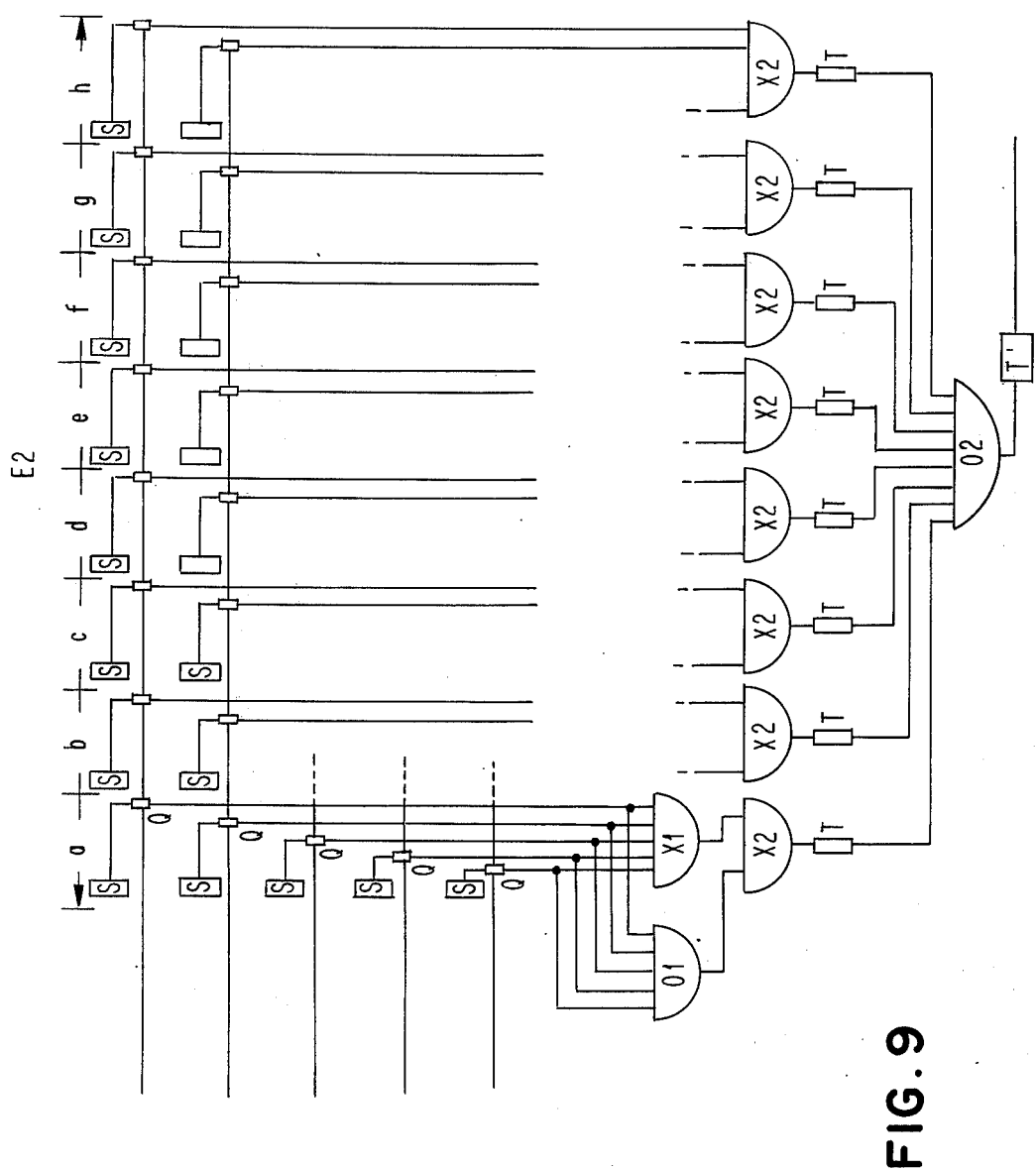

The general description of logic 54 being above-indicated, combined FIGS. 8 and 9 in accordance with FIG. 10, describe the circuits of Table 3 in detail. It was already seen in the definition of the table and in the description of its purposes, that its structure enables a register-arrangement embodiment, a register corresponding to each array of the table. It was seen that, therefore, one has a number of registers called "group registers" equal to the maximum possible number of independent groups in the network plus one register, called "new connection register". It was seen that each array of Table 3, therefore each register of its embodiment, includes two parts, a part E1 having a number of positions equal to the number of multiplex lines to be interconnected, and a part E2 including a number of positions equal to the number of different channels. Of course, in a given state of the network, the number of independent groups is very often lower than the maximum possible number of independent groups, in this case, all the group registers are not in use. In the case of foregoing example only registers 61, 62 and 63 are in use for the three groups of independent lines in the corresponding initial state of the network. The register positions consist in memory positions and are referenced with squares S on FIGS. 8 and 9. In the registers, a position with the same order corresponds to a same line for part E1, to a same channel for part E2.

FIG. 8 corresponds to the circuits of part E1 of Table 3, i.e. part E1 of the group registers and of the new connection register. In FIG. 8, there is also shown the assembly of the circuits enabling the successive comparison of the contents of part E1 of each group register, with the contents of part E1 of the new-connection register. The circuits corresponding to part E2 of table 3 are shown on FIG. 9, i.e. part E2 of the group registers and of the new connection register. Circuits for carring out the required comparisons about the contents of this part of the registers are also shown in FIG. 9.

FIGS. 8 and 9 correspond to the case of the network of FIG. 1 taken as an example in this description, but this is not limiting the scope of the invention. Previously it was shown that, generally, there is a number of registers equal to the number of possible independent groups in the network, plus one register provided for the new connection, and the number of positions in parts E1 and E2 of this register has been defined. The circuits associated in accordance with the number of registers corresponding to the example are shown on FIGS. 8 and 9 and the general way to determine said circuits will be shown through this example.

In FIG. 8, it can be seen that a series of parallelly controlled gates G is associated to part E1 of each group register, this series includes a number of gates equal to the number of positions in part E1 of the register to which it is associated. Thus, in the case of the network of FIG. 1, where five group registers are required, five arrays 61 to 65 of 11 group register positions can be seen on FIG. 8, each one being associated to an array of 11 gates G controlled by a same line (line CG1 for the first array). The outputs of the positions of same order of the group registers after passage through the respective gates controlling them, are supplied to an OR circuit 0 the output of which forms the first input of an AND circuit A and the second input of which is formed by the output of the position of same order of the new connection register. This is shown in full in FIG. 8 for the positions of column L11 and column M5. It is the same operation for each order of position, as indicated fragmentarily. The outputs of the corresponding AND circuits are delivered on a same common OR ciruit; in FIG. 8, OR circuit 66 receives the output of the AND circuits of column L11 to column M5. The circuits enabling the successive comparisons for part E1 of the contents of the group registers with the one of the new connection register, are formed by the arrays of gates G. The control of gates G is carried out in parallel and the arrays are successively controlled by a switch. The switch is provided with a number of positions equal to the number of gate arrays. In the case of the example used with FIG. 8, there are five positions. This switch is shown in the figure as a mechanical device SW1, but any electrical or electronic solution can be adopted; its common point is connected to any suitable signal voltage source adapted to control the gates.

When explaining the use of Table 3, it was seen that it is possible to have the cases as follows: no group includes any one of the two lines which will be interconnected by the new connection, or only one group includes one of the lines, or only one group includes the two lines, or a group includes one of the lines, and another group includes the other one.

It results that, as far as part E1 is concerned, when comparing the contents of a group register to the contents of the new-connection register, there can be either 0, 1 or 2 positions of this register giving a coincidence and it is sufficient to not the lack of coincidence or the presence of this coincidence, should it be produced by one or two positions. This result is obtained by connecting the output of the common OR circuit (OR circuit 66 on FIG. 8), to the common point of a switch operating in synchronization with the switch controlling the gates and which scans the inputs of a number of latches equal to the number of group registers, which enables to record in these latches, called "coincidence latches", the fact that there is a coincidence or not for each comparison. In FIG. 8, said switch is switch SW2 and the coincidence latches which are five in the example, are latches 67-1 to 67-5. Switch SW2 operates in synchronism with switch SW1. In the same way, when studying Table 3, it was seen that when a group register gives a coincidence, a search should be carried out within this group to find at least one free channel and that when two registers give a coincidence, a search should be carried out to determine whether some channels can interfer or not if the new connection is ensured. The way to use part E2 of Table 3 was shown above. In this embodiment, this part is also formed by memeory positions, it is shown on FIG. 9. The register position arrays corresponding respectively to part E2 of the group registers and an array correspondig to part E2 of the new-connection register are found again. Similarly to FIG. 8 for part E1, FIG. 9 shows the embodiment of part E2 for the network of FIG. 1. Accordingly, there are in the figure, five register position arrays corresponding to part E2 of the five group registers 61 to 65 required in the case of this example and another array corresponding to new connection register 60. Part E2 of each register includes a number of positions equal to the number of different transmission channels. In the example more particularly shown in FIG. 9, therefore, there are eight positions in part E2 of each register. An array of gates Q is associated to the position array of each group register in this part E2, all gates Q of an array being controlled in parallel. Each gate array is controlled by the output of the corresponding coincidence latch. In each register, the positions with a same order (in a same column in FIG. 9) correspond to a same channel.

The output of each position with the same order, of the group registers, is delivered, after passage through the gate controlling it, on a set of two OR circuits including an ordinary OR circuit (OR circuit 01, etc, in FIG. 9) and an exclusive OR cirucit (OR circuit X1, etc. of FIG. 9). The output of either one of these two circuits is delivered on another exclusive OR circuit (OR circuit X2, etc, in FIG. 9) the output of which is provided on the input controlling the position with the same order on the new connection register in its part E2; said position is also called "channel latch T". This is repeated for each column. All the outputs of the positionsT of part E2 of the new-connection register of register 60, FIG. 9, are provided to an ordinary OR circuit (circuit 02 of FIG. 9) the output of which controls a latch T' indicating a possibility or an impossibility condition. If the connection is possible, it would be usable if there remains at least one free channel; any free channel is indicated by the fact that the output of OR circuit 01 corresponding to said channel is null; this id detected by a circuit not shown on FIG. 9.

If the comparison of the registers gives no coincidence, no coincidence latch (latches 67-1 to 67-5 of FIG. 8) is conditioned; all gates Q of FIG. 9 are closed; all positions T of array 60 of FIG. 9 are set to zero, whatever the use of the channels in the groups of the initial state, may be. The two lines to be connected form a new group, where any channel is free, any on of OR circuits 01 was set to zero, the check of said circuits 01 detects this condition.

For one coincidence state, one coincidence latch is set to 1, only one array of gates Q is open, and even if any one position in this array is set to 1, both circuits 01 and X1 of the column where is this position, deliver 1; therefore, corresponding circuit X2 provides 0, all positions T of array 60 remain set to zero. The check of OR circuits 01, will determination of whether there is an available free channel or not.

For two states of coincidence, two latches 67 are set to 1, two arrays of gates Q are open. If in these two arrays, a position with the same order is set to 1, this corresponds to the case of a same channel in use; then, corresponding circuit X1 receives two 1's and delivers 0, circuit 01 receives said two 1's and delivers 1, circuit X2 receives 0 and 1 and delivers 1; the position T with the same order (i.e. the one situated in the same column in FIG. 9) in array 60, goes to 1, OR circuit 02 delivers 1, latch T' goes to 1; therefore this state corresponds to an impossiblity condition. If two 1 are never found in a same column, OR circuits 01 and X1 receive 0 or only 1 and circuit X2 of the column delivers 0; all positions T of array 60 are set to 0 as well as latch T'. Latch T' being set to zero, this indicates that the connection is possible.

But then it is necessary to check that there remains a channel available for the new connection. An OR circuit 01 will be set to zero only if the channel to which it corresponds, is free in the two groups of lines concerned in this description. Therefore, checking OR circuit 01 enables again to determine whether there is a channel available to use the connection, or not.

A composition of logic 54 enabling an embodiment of this invention is described above. When the invention is applied to a switching exchange controlled by a computer, the various operations according to the invention, can be performed by this computer. In such case, it is necessary that the various circuits, positions or memory units of the computer provide the full function of the memory positions and of the circuits of logic 54, and this, in accordance with the sequence described for the various operations. Now, this is generally possible whatever the type of the program controlling the computer and the language in which this program is written, may be. Examples of computer controlled exchanges are the IBM 2750 and 3750 Line Switching Systems. Systems of this general kind are described in the prior art, for example in U.S. Pat. No. 3,513,263 and in the IBM Journal of Research and development. In general, data processor controlled exchanges having conference call multiple cross-point and the capability of providing extra memory registers and logical control are suitable for modification as afore-described to carry out this invention. A key point to the present invention is the provision of tables and logic, utilizing equipment in and/or added to such prior art systems to supervise multiplex data traffic through such "conference call" switches.

It should be also noted that only the problem concerning the connection of multiplex lines, the solution of which is the object of this invention, has been considered. Of course, the individual lines connected to exchange 41, the connection of which is only supervised by logic 53, can be connected to any device as a subscriber's set as well as a terminal or a computer unit.

In particular, it is possible, should it be connected to a terminal, to connect a line of the individual type to a multiplex line, if the transmission mode with the device connected to said multiplex line, is in accordance with the channels in use on the multiplex channel; as it is connected to only one device, the problems are fewer. The lines of the individual type in this case, (i.e. able to be connected to a multiplex line to make a single communication), will be, in fact, in such a case considered as multiplex lines and it would be necessary to make them appear in the tables of logic 54 and the connections concerning said multiplex lines will be treated by said logic as described in the case of the invention.

While the invention has been particularly shown and described with reference to the preferred embodiment thereof, it will be understood by those skilled in the art that various changes in form and details may be made therein without departing from the spirit and scope of the invention.

What is claimed is:

1. In a switching system providing space division interconnection of multiplex lines in independent groups wherein no line of any group formed by a specific interconnection participates in any other group,
   a first matrix comprising storage element arrays equal in number to the maximum number of independent groups, each array having storage elements corresponding to said lines for indicating the connected status of respective lines in said group,
   an additional storage array having storage elements corresponding to said lines for indicating a proposed new connection of said lines,
   and logic means for comparing, one array at a time, the arrays of said first matrix with said additional array,
   a set of latches for recording, by first matrix array, coincidence between at least one element of corresponding first matrix arrays and said additional array,
   a second matrix comprising storage element arrays corresponding to said latches, each said second matrix array having an ordered series of storage elements corresponding to multiplex channels of said lines for indicating use status of said channels, and logic means responsive to said latches to compare said second matrix arrays, selectively according to the state of said latches, and to provide signals indicative of those orders wherein more than one channel is in use.

2. For use in a line swithcing network, means for determining whether a proposed space connection involving lines having multiplex channels is possible without interference with existing connections, said means comprising:

a table including a plurality of group registers equal in number to the maximum possible number of independent groups of multiplex lines in the network, each said group register having a first part in which respective storage elements correspond to different lines for recording which of said lines in the respective group are connected in that group, a new connection register having storage elements also corresponding to said lines for recording indication of the lines to be connected to make a new connection, comparing circuits connected between each of said group registers and said new connection register for producing respective potential conflict identifying signals upon any coincidence between a connected line indication in said group registers and a line indication in said new connection register, said potential conflict identifying signals identifying which of said group registers are producing such coincidence, each said group register further comprising a second part containing as many elements of storage as there are multiplex channels in any one said lines for indicating which of said channels are in use in each said group, and means under the control of said potential conflict identifying signals for comparing the states of corresponding elements of said second part and responsive to indications therein that any channel is in use in more than one line identified by said signals.

* * * * *